United States Patent [19]

Goldstein et al.

[11] 4,189,217
[45] Feb. 19, 1980

[54] DOCUMENT PRINTING SYSTEM

[75] Inventors: Amnon Goldstein, Manhasset, N.Y.; Robert W. Swett, Smoke Rise, N.J.; David L. Greenwood, New York, N.Y.

[73] Assignee: Sweda International, Inc., Paramus, N.J.

[21] Appl. No.: 901,869

[22] Filed: May 1, 1978

Related U.S. Application Data

[63] Continuation of Ser. No. 675,401, Apr. 9, 1976, abandoned.

[51] Int. Cl.² ............... G03B 15/00; G03B 17/06
[52] U.S. Cl. ............................................. 354/7; 354/15
[58] Field of Search .................... 354/7, 12, 13, 14, 15

[56] References Cited

U.S. PATENT DOCUMENTS

| | | | |
|---|---|---|---|
| 3,262,379 | 7/1966 | Bauer, Jr. et al. | 354/7 |
| 3,677,148 | 7/1972 | Chen | 354/15 X |
| 3,685,406 | 8/1972 | Chen | 354/15 X |
| 3,702,094 | 11/1972 | Sinnott et al. | 354/7 |
| 3,705,543 | 12/1972 | Rees | 354/15 X |
| 3,709,117 | 1/1973 | Sansone | 354/7 |

*Primary Examiner*—Michael L. Gellner
*Attorney, Agent, or Firm*—Norman Friedman; Robert F. Rotella

[57] ABSTRACT

System for printing particular information-bearing symbols corresponding to data emanating from a source comprising: source means capable of generating data in a particular sequence; memory means for storing information-bearing symbols; selection means for selecting particular symbols from said memory means corresponding to data emanating from said source; said selection means ordering said particular symbols in a predetermined sequence for printing; a medium adapted to bear printed information-bearing symbols; and transmitting means for transmitting each of said particular characters from said memory means to said medium.

21 Claims, 11 Drawing Figures

DOCUMENT PRINTING SYSTEM

This is a continuation, of application Ser. No. 675,401 filed Apr. 9, 1976, now abandoned.

BACKGROUND OF THE INVENTION

The present invention relates to a system for electronically composing document formats consisting of visually perceivable marks of printed data, bar code or hard copy and applying those marks to a record medium which is intended to be human and machine readable.

An example of an application of this invention lies in the automatic printing of documents such as tags and labels of the type employed in retail applications. Such tags and labels constitute identification documents which are attached to goods.

The present invention has the capability of accepting information and composing instructions from a number of success including: keyboard, card reader, punched cards, magnetic tape, computer or mini-computer. The composing instructions processed by a memory permit the composing of the information in a desired format to be printed on such documents. Since such composition is performed automatically it is possible to generate as many or as few documents containing identical information as may be required followed by a rapid changeover to a series of documents or even a single document containing new information printed thereon.

The system further includes the capability of printing not only characters selected from conventional human readable type faces but also may print various forms of indicia including optical character recognition type characters (OCR), bar codes, etc., selected from fonts of such characters.

The necessity for more rapid and more accurate processing of identification documents has stimulated the industry to look for solutions by which such identification documents may be read by machine. One solution has been the printing of information in a code on such identification documents which may be read by a suitable optical reader. Such coded information on individual tags and labels would permit the machine reading of those documents by the use of, for example, a hand-wandable light pen at the point of sale. In addition, large numbers of such identification documents may be read by means of an optical batch reader at periodic intervals.

One such code which has been proposed by the National Retail Merchants Association as a standard has been designated as the OCR-A format. Such proposals and standards and specifications for such documents and OCR characters are set forth in the publication "Voluntary Retail Identification Standard Specification - A-1974" dated Sept. 12, 1974 and issued by the National Retail Merchants Association of New York, New York. The foregoing publication is, in part, based upon the publication "American National Standard Character Set and Print Quality for Optical Character Recognition, (OCR-A), X3.17-1974" issued in 1974 by the American National Standards Institute of New York, New York. Both the foregoing publications are hereby incorporated by reference into the disclosure of the present patent application. However, the present system is adaptable to using formats of any other type as, for instance, bar codes in conformance with the standard known as the Universal Product Code (UPC).

Thus, the present system has the capability of printing human readable characters, OCR codes and bar codes in whatever combination desired for a particular application.

SUMMARY OF THE INVENTION

The disclosure is directed to a system for printing human and machine-readable information in selected formats and font sizes in line-parallel, character-serial order on a moving document wherein the lines of print are in the direction of movement of the document. There is disclosed memory means to electronically compose the message to be printed; means to read out the composed message in line-parallel, character-serial sequences; a character generator responsive to signals emanating from said memory; means for converting, storing and developing signals from the generator in readable form on a moving intermediate storage medium in line-parallel, character-serial order while transferring earlier stored and developed information to a moving document.

The system includes an electrographic printer such as an electrophotographic printer or electrostatic matrix printer into which the various characters which are to be printed on the document are inputted. All of the various fonts of characters be they human readable, OCR or bar code are embodied in a character memory which may be in the form of a cylindrical mask or an electronic read only memory (ROM) containing the individual characters in the form of photographic images or matrix patterns.

In the case of the electrophotographic embodiment, fonts of type characters may be arranged in the form of circumferential bands comprising a mask encircling a drum. Located within the drum are a plurality of light sources, each one being associated with a particular band of characters. As the drum rotates, the bands containing the characters pass cyclically in proximity to the light sources which are selectively actuated to cause individual characters to become illuminated and projected onto an optical system which is fed to the input of the printing system. The printing system may be considered to operate in a similar fashion as a xerographic printer and transfers the imaged character as its input to a final printed character on the document.

In the case of the matrix electrostatic embodiment, an electrode matrix generates an electrostatic dot pattern under control of a ROM character generator which may be considered as the functional equivalent of the mask of the electrophotographic embodiment generates an electrostatic dot pattern onto an intermediate surface which then is processed in a manner similar to a electrophotographic proessor for transfer of the imaged character at its input to a final printed character on the document.

BRIEF DESCRIPTION OF THE DRAWINGS

In the drawings:

FIG. 2 comprises FIGS. 2a, 2b, and 2c and is a plan view of a character mask employed in the electrophotographic printing system;

DESCRIPTION OF THE INVENTION

Figure 1:
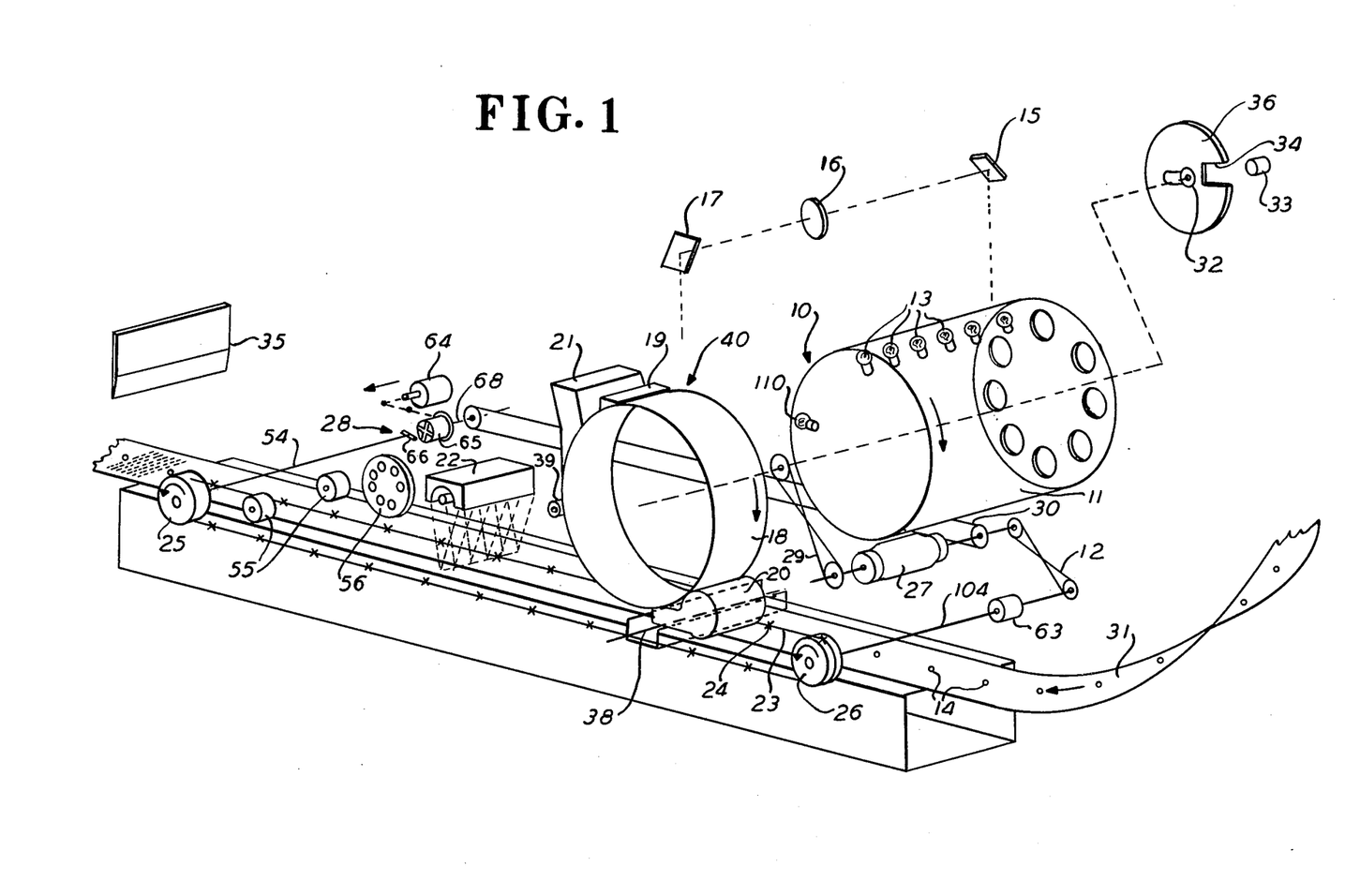
FIG. 1 is a perspective view of the electrophotographic printing system.

Referring now to FIG. 1, which shows the electrophotographic embodiment of the invention, the printing system includes a rotatable cylindrical drum 10 the surface of which is provided with a mask 11 upon which the various fonts of characters appear. Mask 11 may preferably comprise a sheet of photographic film upon which the characters appear either as positive or negative images in circumferential bands. Drum 10 and mask 11 may be web or disk-like in form.

Located within drum 10 are a plurality of light sources 13 each of which is associated with a circumferentially extending band of characters on mask 11. The light sources 13 may comprise individual lamps disposed adjacent to the drum surface. Alternatively, the light sources 13 may be located elsewhere and the light rays may be conveyed to the drum surface by the use of individual fiber optic light pipes or by means of mirrors and lenses. In any case, an independent source of illumination is associated with each character band on the mask 11, the individual sources being aligned in a row parallel to the axis of drum 10.

Each light source 13 is flashed upon command so that a particular character appearing on the mask 11 opposite the light source at that instant of time is illuminated. The illuminated character is projected onto the surface of a web, disk or cylindrical drum 18 forming part of an electrophotographic printing station 40. The character may be projected by a fiber optic light pipe or by means of a lens and mirror arrangement including, for instance, mirror 15, focusing lens 16 and mirror 17.

The drum 18 serves to store the optical character image falling onto its surface as a latent electrostatic image for subsequent development of the image and transfer as a printed character on a document.

The electrophotographic system described herein utilizes essentially well-known electrophotographic principles. Accordingly, this portion of the invention will be described only briefly. Drum 18 is coated with selenium or other photoconductive material which can accept and hold an electrostatic charge and which can be discharged when struck by light. A charging station 19 applies a uniform charge to the photoconductive surface just prior to the point at which the drum 18 rotates into the imaging area beneath mirror 17.

The character image projected onto the drum 18 surface corresponds precisely to the image being projected, thereby creating a latent electrostatic image in the form of a discharged area on the surface. The drum 18 carrying the latent image next passes a developing station 20 at which point a toner is applied in a well-known manner to the surface of the drum. The toner adheres to the discharged areas of the drum thereby developing a pattern corresponding to the latent image of the character.

As drum 18 rotates further, it comes in contact with the document web 31. At this point, the toner image which appears on the surface of drum 18 is transferred to the document web 31 with the assistance of a transfer corona 38. As drum 18 continues rotating, a cleaning station 21 removes any remaining toner powder which was not transferred to the web 31. The drum 18 is now in a position to receive a new charge at station 19 and to repeat the image receiving and transferring process once again. Illumination means for uniformly discharging the surface of drum 18 are provided at 39 to thereby render the surface ready to accept new character images for subsequent developing and transfer to the documents.

Document stock 31 may be a record medium such as paper, plastic film or the like on which the developed characters are transferred and fixed. Document stock 31 may be fed through the printing station 40 in a continuous web or the stock may be precut into individual segments before being fed to the printing station.

As web 31 moves away from the printer 40 it is subjected to the action of a fuser 22 which acts to use and to bond the toner to permanently fix the image of the character to the document surface. In the preferred embodiment, the fuser 22 comprises a source of infrared rays line focused onto the surface of the document 31 thereby fusing the toner to the document surface.

The document web 31 is transported through the printing station 40 by means of an endless transport belt or chain 23 which contains projections or fingers 24 for engaging slotted holes 14 provided in the document stock 31. Transport belt or chain 23 is looped around a forward drive wheel 25 and an idler wheel 26. The belt or chain 23 is moved at a speed synchronized with the tangential velocity of the surface of drum 18 so that the toner images are transferred without smearing from the drum surface to the document surface 31.

Motive power for moving the transport belt 23 is furnished by a motor 27 having its output shaft coupled through a gear or pulley arrangement 30 which rotates a shaft 54 coupled, through a clutch mechanism 28 (described more fully hereinafter), to the forward drive wheel 25.

In the normal mode of operation, clutch 28 and drive wheel 25 are engaged, thereby causing the transport belt or chain 23 to move under the power of motor 27. The photomask drum 10 is also powered by motor 27 through a gear or pulley arrangement 29 which causes rotation of the drum. As is evident, the respective gear ratios or timing belt pulley ratios can be selected to insure positional and velocity synchronization between drum 10 and transport belt or chain 23.

Figure 2A:
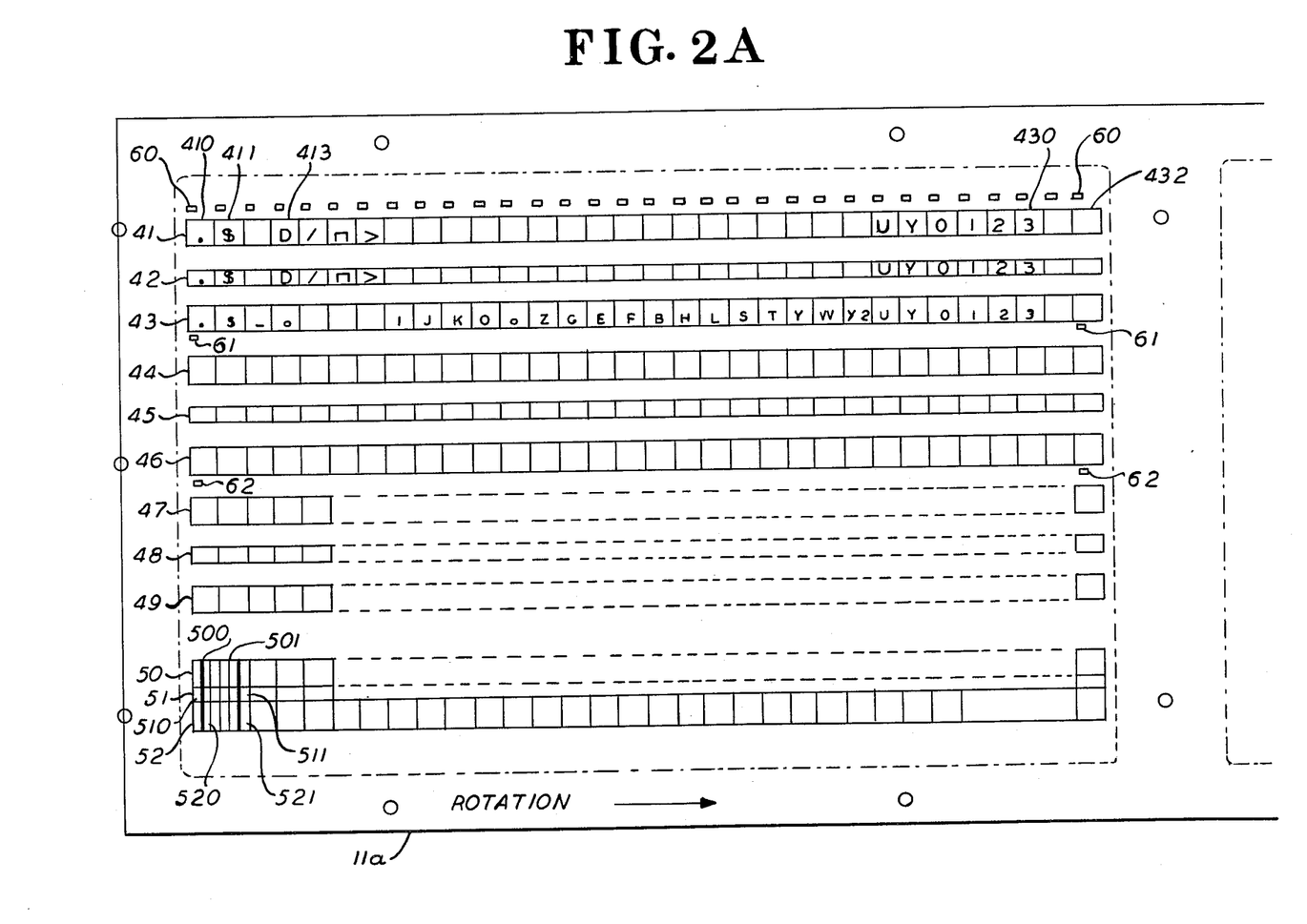
Figure 2B:
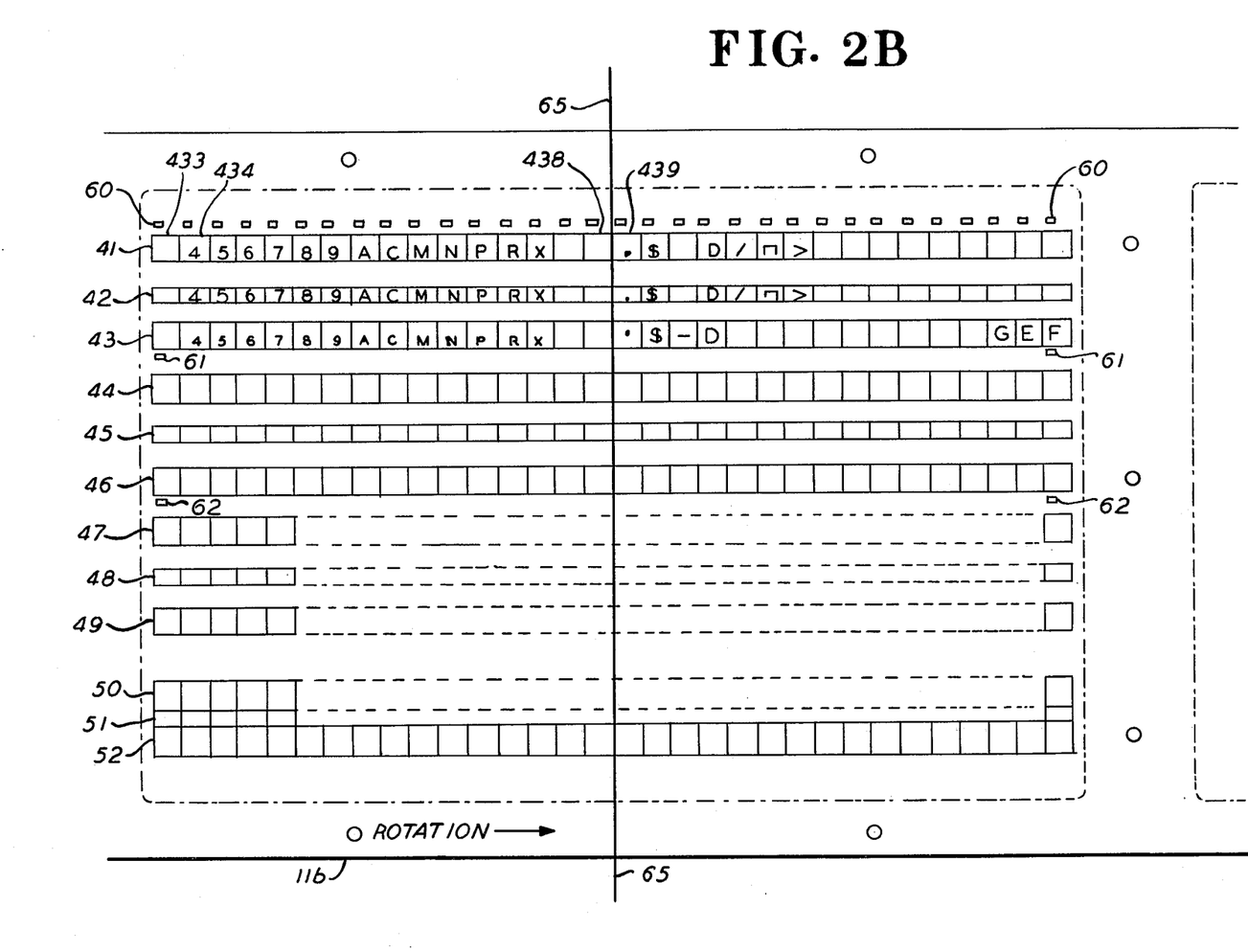
Figure 2C:
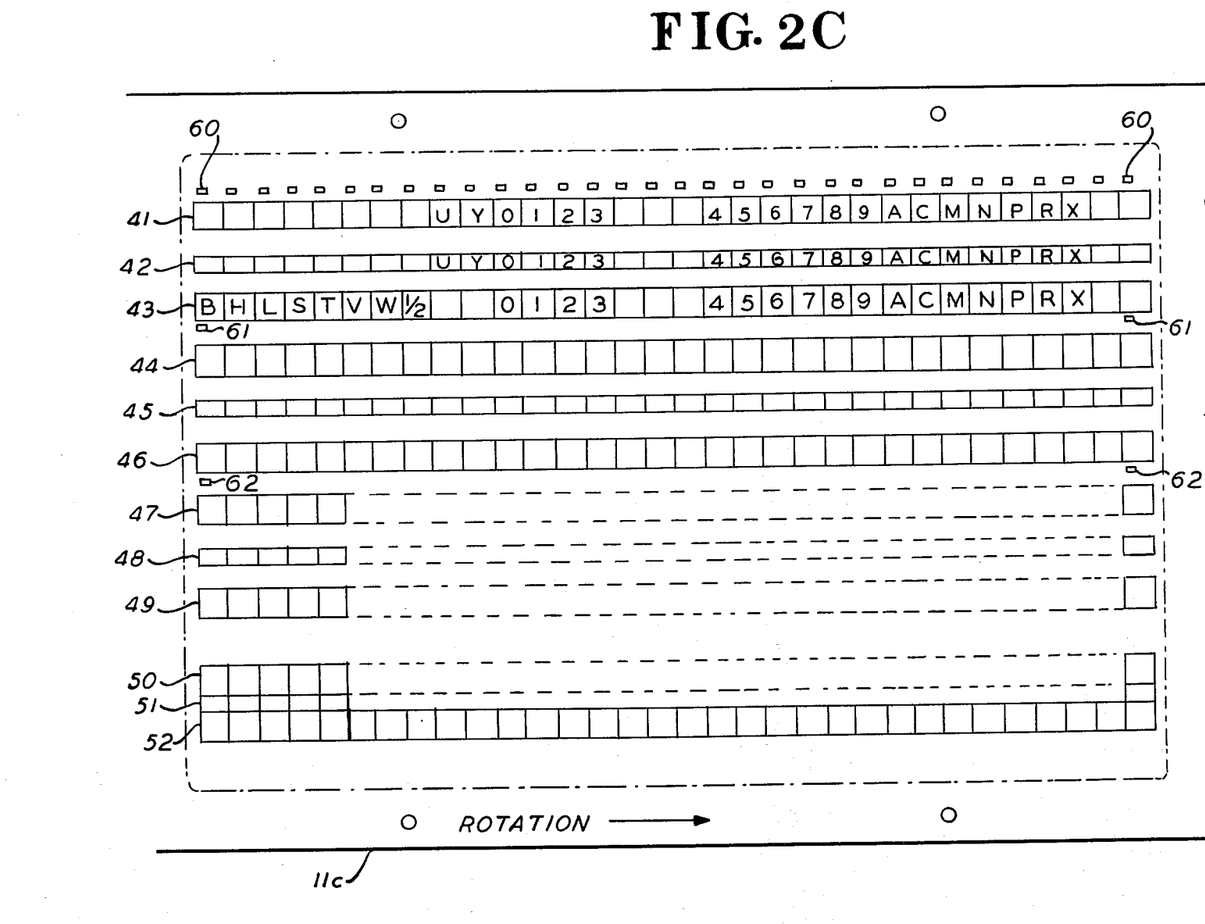

FIG. 2 shows a representation of the photomask 11 unrolled from its position on drum 10. The mask 11 is divided into three equally-spaced segments, 11a, 11b, 11c, each of the segments extending over a vertex angle of approximately 105° measured from the axis of drum 10. As viewed in FIG. 2 of the drawing, each segment of the mask 11 contains a plurality of horizontal bands bearing the images of the characters which may be selected for printing on the document stock 31.

A number of bands of characters 41 thru 52, appears on each of the three segments comprising the photomask 11. Although twelve bands are shown, it is to be understood that any suitable number of bands may be provided within the scope of the present invention. Each of the segments is further divided to provide thirty-two windows within each band. Within each window an individual character or portions of individual characters may appear. Thus, the portion of band 41 in segment 11a includes window 410 containing a period; window 411 containing a dollar sign; window 430 containing the numeral 3. Band 41 is continued on segment 11b beginning with window 433 and continues with window 434, bearing the numeral 4.

Each window is of the same width notwithstanding the fact that the characters which appear within each window may have differing pitches and sizes. Thus, band 41 may include a series of characters which comprise an OCR-A font while band 42 may include characters designated as human readable comprising a font of small type and a font of large type. The remaining bands may contain different styles of type in either large or small sizes, other fonts of OCR type or other symbols, such as those forming a bar code.

A large symbol, that is, a symbol whose elements cannot be fully accommodated by a single window, may be generated by simultaneously illuminating these windows which contain the respective elements of the symbol. In particular, such symbols may have elements in a particular vertical window location but extending over a plurality of horizontal bands on mask 11.

In the case of symbols comprising a bar code, such as the UPC code, it has been found with the particular embodiment disclosed herein, that three bands of characters on mask 11 are sufficient to completely accommodate the character symbols. It is to be understood, however, that mask 11 may be made of any desired dimensions consistent with the types of character fonts selected and that symbols may be made to extend over any number of bands, where necessary.

Referring in particular to FIG. 2a, it can be seen that bands 50, 51 and 52 extend horizontally across the mask 11 without any spacing between those bands. Windows 500, 510, 520 associated, respectively, with bands 50, 51 and 52 are in vertical alignment and together accommodate a vertically-extending bar code symbol consisting of a wide dark band followed by a narrow dark band. The symbol accommodated in windows 500, 510 and 520 would be imaged by simultaneously illuminating the light sources 13 associated with bands 50, 51 and 52 when said windows are adjacent to the light sources. Thereafter the symbol would be developed and transferred by the printing station as in the case of any other character.

Similarly, windows 501, 511 and 521 accommodate a bar code symbol consisting of a narrow dark band followed by a wide dark band.

This arrangement permits each line of printing appearing on the document to correspond with at least one band of the mask 11. A given line on the document may include printed information with portions in one size of type and portions in another size or format all on the same line.

An individual light source 13 such as shown in FIG. 1 may be associated with each of the twelve bands of characters. Alternatively, a number of light sources 13 which is less than the number of bands on the mask 11 may be provided. In the latter case, the drum 10 may be shifted, either automatically or manually, in an axial direction to locate the other set or sets of bands of characters for cooperation with the light sources 13. As drum 10 rotates together with its associated mask 11, individual light sources 13 will be activated or flashed on command to cause imaging of the character located in a particular window adjacent to the light source at that instant of time onto the photosensitive surface of drum 18 through the optical path between the mask 11 and drum 18 as described above.

Associated with drum 10 is a timing disk 36 containing a reference window 34. A stationary source of light 32 may be disposed within the drum 10. As reference window 34 rotates as a result of the rotary motion of drum 10, light from source 32 will periodically exit the window 34 and impinge upon a sensor 33 which functions as a generator of timing pulses which are fed to the command circuitry, to be described more fully hereinafter.

Located at the top of each segment 11a, 11b, 11c of the mask 11 is a timing track 60 consisting of a band of equally spaced transparent apertures. A sensor system 110 comprising a light source and sensor (FIG. 1) cooperates with the timing track 60 to furnish an electrical signal to the command circuit. The position of each aperture is determined by the location of the windows containing the characters comprising the font by the command circuit responding to the electrical signals furnished thereto by the sensor system 110. Timing tracks 61, 62 are located so as to present a timing track to the sensor systems 110 whenever the mask is shifted axially to select another set of character bands, in the case where there are provided less light sources than there are character bands on the mask 11 as described above.

The control circuitry can be made to locate a particular window containing the character to be flashed by a light source 13 by counting each of the apertures from a particular reference line 65. In FIG. 1, reference window 34 of timing disk 31 is angularly oriented to coincide with the position of reference line 65 on mask 11. Thus, sensor 33 will receive one reference or clock pulse per revolution of drum 10 which is fed to the control circuitry to initiate counting of the apertures on the timing track 60. The counting of the apertures is accomplished by the circuitry counting each electrical pulse generated by the sensor system 110.

An address memory unit within the control circuitry contains the address location by band and window of every character on the mask 11. When the timing track 60 aperture count equals the address location of the next character to be flashed, the control circuitry will cause the particular light source 13 associated with the band in which the character is located to be illuminated to thereby image that character onto the printing station 40.

During each revolution of drum 10, individual light sources 13 will be flashed to illuminate the selected characters which appear in the band of mask 11 associated with the particular light source. Also, several light sources may be simultaneously flashed to illuminate selected character elements which appear in more than one band of mask 11.

Figure 3:
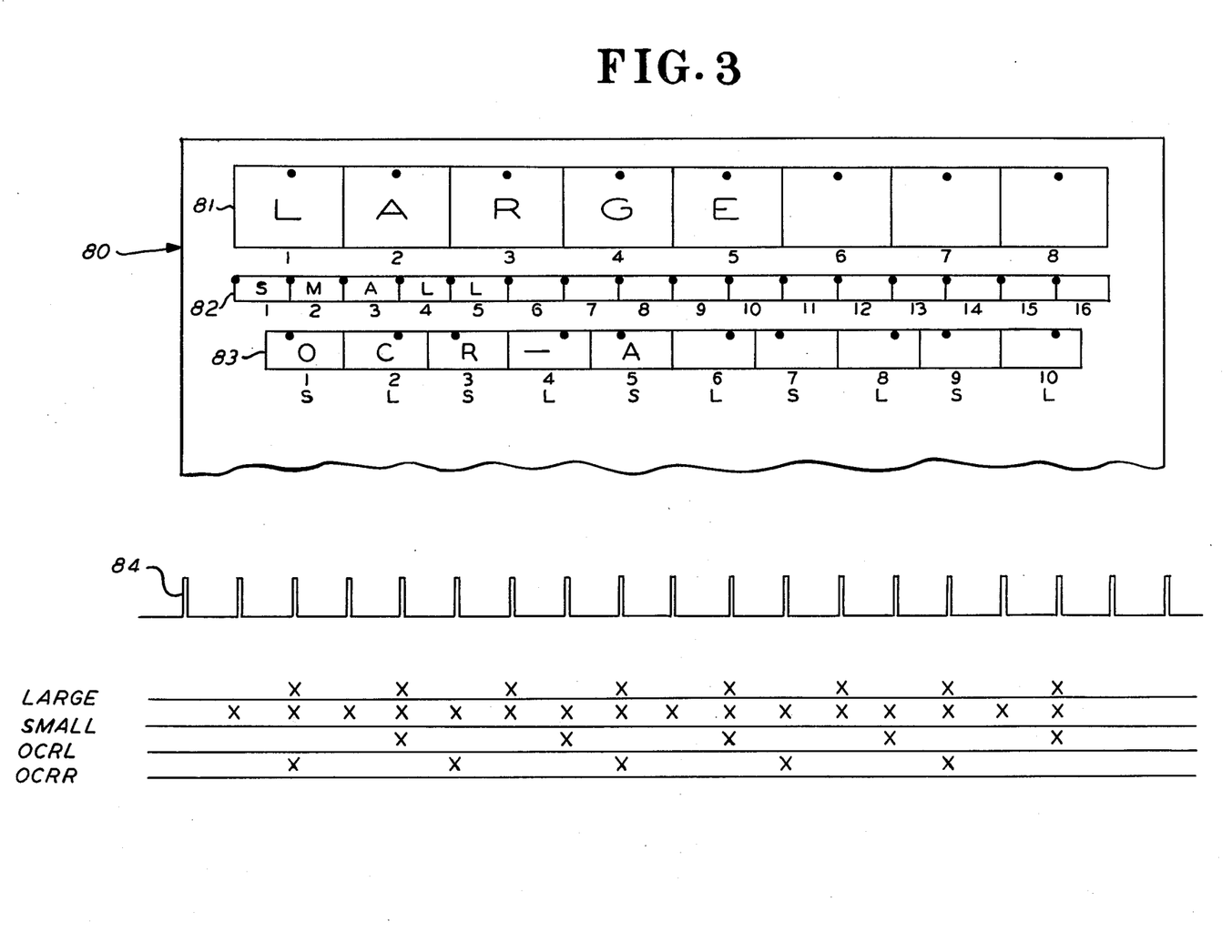
FIG. 3 is a schematic diagram showing the manner in which a document is printed.

Referring now to FIG. 3, there is shown a typical format of a document printed in accordance with the invention. Although the document 80 is shown as having three lines of print it is to be understood that it is possible to print as many lines on the document as appear bands on the mask 11. The first line or print 81 is intended to represent a line of human readable large characters. The second line 82 is intended to represent a line or human readable small characters. The third line 83 contains characters from the OCR-A font.

The present invention does not effectuate printing on a line-by-line basis as is common in the prior art. Instead, printing is accomplished in a line parallel, character serial sequence. That is, printing is sequenced according to a columnar fashion by which those characters which are closest to, say, the left edge of the document are printed first, regardless of the line in which they might appear. For example, the sequence of printing in the example shown in FIG. 3 would be as follows: First printed would be the "S" of line 82 during the first revolution of drum 10. During the second revolution of drum 10, the "L" of line 81, the "M" of line 82, and the "O" of line 83 would be printed: the respective light source 13 being flashed as each character reaches the imaging area during that second revolution. During the third revolution, the "A" of line 82 would be printed. The fourth revolution of drum 10 causes the printing of the "A" of line 81 and the "C" of line 83. On the fifth revolution of the drum 10 the "L" of line 82 is printed. This sequence of printing is repeated until all of the characters of all of the lines which are to appear on the document 80 are completed. The sequence of characters printed on document 80 is shown in the bottom portion of FIG. 3. Each cross represents the portion of the font appearing on mask 11 which is selected during each successive rotation of the drum 10.

The graph 84 in FIG. 3 is a representation of the cyclic timing pulses which are generated once per revolution of drum 10 by virtue of the reference window 34 described above.

Figure 4:
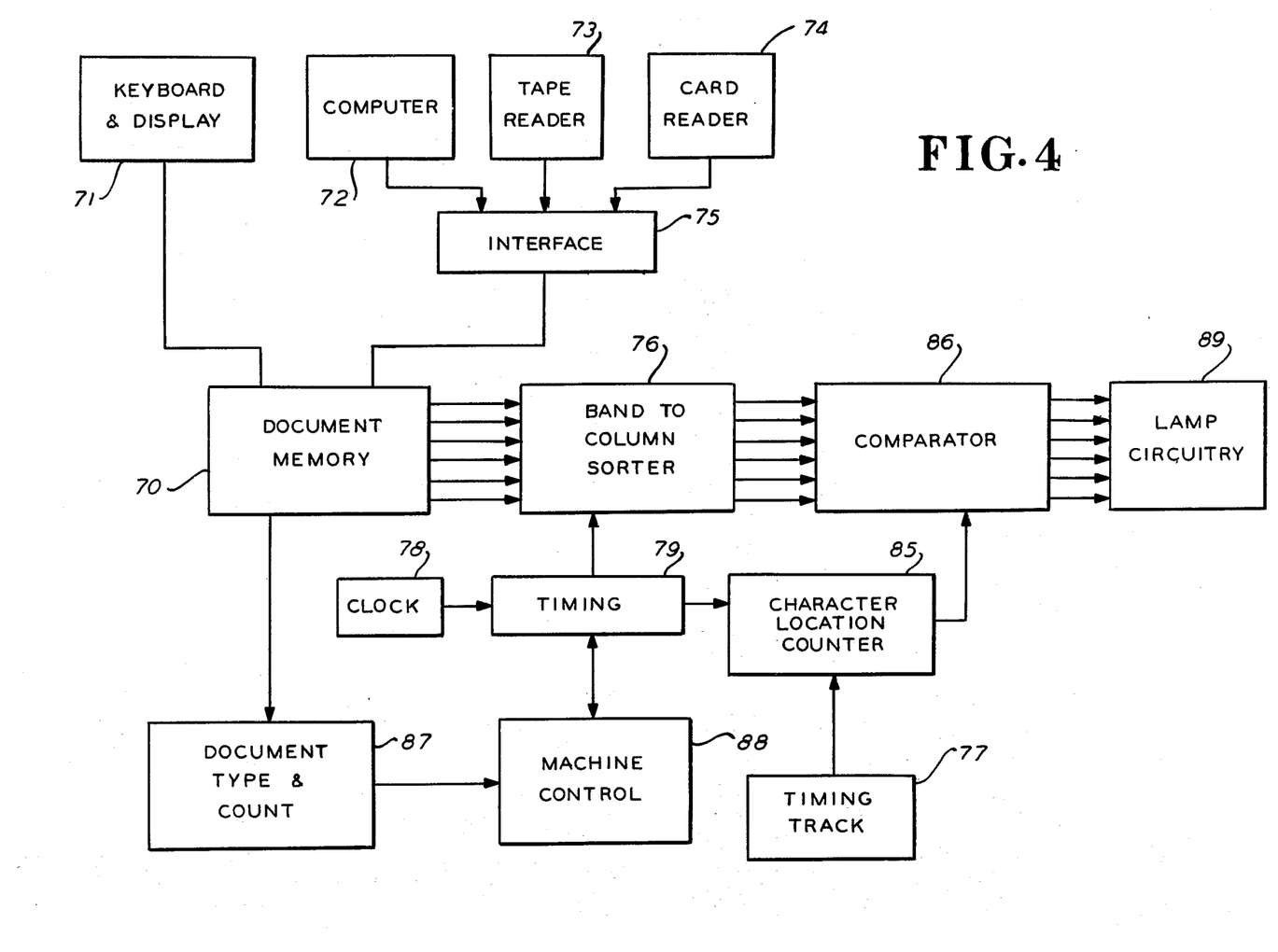
FIG. 4 is a block diagram of the electronic circuit for the electrophotographic printing system.

Referring now to FIG. 4, there is shown a block diagram representation of the electronic command circuitry which controls the operation of the electrophotographic printing system disclosed in FIG. 1. A document memory 70 is adapted to receive data and instructions from a number of off-line peripherals including a manual keyboard and display system 71. A number of on-line peripherals such as a computer 72, tape reader 73 or card reader 74 can also provide data and instructions to the document memory 70 through a conventional communications interface network 75.

The peripheral units provide the data which is intended to be formatted and printed on the document by the printing system. Such data is generated by the peripherals in a character-by-character sequence (also known as a character serial sequence) with appropriate punctuation signals, end of line signals, carriage return signals, end of message signals, and the like to enable the data to be composed by arranging it in a format suitable for a document having a particular width.

The peripheral units also have the capability of supplying instructions to the system which govern such functions as: the control of the number of documents to be printed, control of the number of documents printed bearing the identical message, and control of a number of auxiliary functions to be described hereinafter.

The document memory 70 accepts the data and instructions from the various peripherals and composes the data on a line-by-line format representative of the message which is to appear on the document as printed.

The document memory 70 may be considered as having two portions; one of which receives data from the on-line and off-line peripherals; and the other of which feeds the processed data and instructions to the various control networks for the carrying out of the proper printing functions. Both document memory portions are interchangeable so that when the data receiving portion has received a complete set of instructions for printing it will command the above-mentioned control networks. During such command phase the other portion of the document memory is receiving new data and instructions for carrying out another sequence of printing.

As previously mentioned, each line of data on the document to be printed corresponds to a band of characters located on the photomask 11 shown in detail in FIG. 2. An output corresponding to each such band is fed from the document memory 70 (which contains the data to be printed in a line-by-line format) to a band-to-column sorter 76.

The composed message is fed to sorter 76 from the document memory 70 in a line parallel character serial sequence. In other words, the characters forming the message are received by network 76 in a time sequence dependent on the position of a character in its respective line from an arbitrary reference line through all the lines of the formatted message in a vertical direction (i.e., perpendicular to the direction in which the message would normally be read).

Accordingly, a plurality of inputs, each of which corresponds to a line of characters of the formatted message, is fed to the band-to-column sorter 76 which controls the sequence of printing of the various characters in a columnar fashion as outlined above, irrespective of the line on the document on which any particular character appears by determining on which bands on the photomask 11 the characters to be printed are located and the location of such characters within each band. Thus, although the peripherals feed the document memory with data to be printed on a character serial line-by-line basis, the sorter 76 generates a timing sequence for printing which is dependent on the columnar location of the characters.

A character location counter 85 maintains a continuous scan of the location of all of the characters on the mask 11 as the latter rotates on drum 10. Whenever a character to be printed, fed from the sorter 76 to a comparator 86 coincides with the character location counter 85 reading, comparator 86 generates an output which activates the lamp circuit 89 and thereby illuminate the character selected on the mask 11 by flashing the particular lamp associated with its respective band on mask 11 at the instant at which the selected character on that band is in proximity to the lamp.

A clock 78 which corresponds to the electrical output of sensor 33 associated with timing disk 36 provides a sequence of cyclic timing pulses which are fed to the timing network 79 which synchronizes the operation of the sorter 76, character location counter 85, and a machine control network 88.

The character location counter 85 provides a series of pulses which corresponds to the passage of each aperture window forming the timing track 60 of mask 11 past a source of illumination and an associated sensor similar to elements 32 and 33, respectively. Whenever a pulse is generated by clock 78 it corresponds to the passage of reference mark 65 of the mask 11 since the reference window 34 of timing disk 36 is aligned with the mark 65. From that point in time, the counter 85 on receiving the timing track signals from network 77 begins counting each such window. The comparator 86 then responds to coincidence between the counted character windows and the selected character location (on a multi-character band level) provided by sorter 76.

A document type and count network 87 receives an input from the document memory 70 and controls such functions as: the number of identical documents to be printed, color striping function (to be described hereinafter), and so forth. A machine control network 88 is controlled by the document type and count network 87 and governs such functions as the starting and stopping of the transport belt 23, generation of single or multipart, cut or perforated documents by suitable actuation of the knife 35.

As mentioned previously, the system has the capability of printing a variety of characters selected from any one or more fonts on a document. In the illustrated embodiment, the characters which may be printed include large type, small type, and OCR-A. It is readily apparant that each of the type fonts used may have different pitch values. In the examples of character fonts used herein, the small human readable characters have a value of 16 characters per inch, the large human readable characters have a value of 8 characters per inch, and the OCR-A characters have a value of 10.67 characters per inch.

The system is designed so that the rotation of the mask 11 on drum 10 is synchronized to the rate of travel of the document web 31, both being moved continuously. For instance, with the illustrated embodiment, one revolution of drum 10 may correspond to an advance of the document stock 31 of one-sixteenth of an inch.

Since web 31 moves continuously, it is necessary to introduce compensation so that characters in different angular locations on drum 10 will be printed with relatively even spacing within a line. Such compensation is achieved by adjusting the location of each character within its associated window.

In addition to the foregoing problem which applies to each set of characters, a further timing problem exists by virtue of the different pitches of the respective character fonts and the fact that drums 10 and 18 are rotated continuously while web 31 is also in constant motion.

Consider the case of a given character on a particular band being flashed, the direction of rotation of the mask 11 being clockwise along with drum 10 in FIG. 1 as well as being shown by the direction of the arrow in the lower portion of FIG. 2. The next character which may be flashed may fall in any angular position along that band or any other band. For instance, considering band 41 in segment 11b, the given character which has just been flashed may have been an 8. The next character to be imaged may be, for instance, a 7 which occupies the adjacent window (and which would pass by the light source 13 next). Or the next character to be imaged may be a 9 which occupies the preceding window (and which has just passed the light source 13).

In the first case, it can be shown that the mask 11 and drum 10 have rotated by an angle of approximately 363.28° while the web has advanced a small fraction above one-sixteenth of an inch. In such a case, were no compensation introduced in the spacing of the characters, the numerals 8 and 7 would be printed an excessive distance apart. In the second case, drum 10 must rotate through an angle just short of a full 360° in order to bring the character 9 into the imaging position adjacent its associated light source 13. Thus, without compensation, the web has advanced nearly the full one-sixteenth of an inch and the character 9 would be printed an undesirably close distance to the character 8 on the same line.

A spatial compensation feature is incorporated in locating the position of the characters within each window so that the characters arrive at the imaging point in the proper location so that the motion of the document stock 31 is compensated for.

Essentially, a character which would otherwise arrive at the imaging point early in relation to its proper position on the document stock 31 is offset slightly away (in the direction of travel) from the reference line 65. Conversely, a character which would otherwise arrive at the imaging point late in relation to its proper position on the document stock 31 is moved slightly closer to the reference line 65. Looking again at FIG. 2b, a reference line 65 (colinear with the axis of drum 10) is arbitrarily selected at the midpoint of segment 11b or between windows 438 and 439 of band 41.

With respect to reference line 65, as the mask 11 rotates along with drum 10 in the indicated direction, characters which fall to the right side of the line would tend to reach the imaging point early and characters appearing to the left of that reference line would tend to reach the imaging point late as mask 11 moves past an arbitrary imaging point in the position of the viewer.

Accordingly, an offset is introduced in the location of the character in each window depending on its angular distance away from the reference line. The amount of offset is incremental and increases with the distance of the character window from reference line 65. Thus, the character which appears at the extreme rightmost position (on the unrolled mask 11 as shown in FIG. 2) from reference line 65 would be moved rightward approximately 1/32nd of an inch while the character which appears at the leftmost extreme position from reference line 65 would be moved leftward by approximately 1/32nd of an inch. Characters falling between the extreme position characters and the reference line 65 would have a lateral offset which becomes correspondingly smaller as the distance to the reference line 65 decreases. It can be shown, for the particular embodiment disclosed, from the size and arrangement of the three segments 11a, 11b, 11c, the width of each character window (3.28125°) and the amount of web travel (0.0625 inch) per 360° rotation of drum 10 that there must be introdued a value of 0.00056966 inch of offset per character.

As previously mentioned, the mask 11 may contain characters which belong to sets having differing pitch values. In the case of large human readable characters which have a pitch of 8 characters per inch, there is a 2 to 1 ratio with respect to the small human readable characters having a 16 character-per-inch pitch. In the case of such large characters, web 31 must move approximately 1/8th of an inch between successive light source 13 firings. Therefore, for each large character printed adjacently on a line of the document the drum 10 undergoes two revolutions between successive character illuminations. In the case of OCR-A characters having the pitch of 3/32 of an inch, the photomask drum 11 should undergo a rotation of three times with characters being illuminated by the light source 13 twice within those three revolutions (or on the average once for every 1½ revolutions of the drum) to achieve proper registry with respect to the other character fonts.

By virtue of the continuous motion of web 31 and the illumination of the OCR-A characters during two out of three revolutions of drum 10, successively fired OCR-A characters would have a tendency to be printed in groups of two with adjacent characters touching, followed by an undesirably long gap and another group of two characters touching. In order to prevent this, the alphabet of OCR characters is repeated twice on the mask 11 within a given band. Furthermore, one such alphabet is shifted rightward from the reference line 65 with each successive character being offset incrementally. The other alphabet of OCR characters is shifted leftward from reference line 65 with the characters being similarly offset incrementally. In this way, the printed OCR characters will be properly spaced within a given line.

In FIG. 3, the term OCR L refers to the leftwardly offset OCR alphabet while OCR R refers to the rightwardly offset OCR alphabet referred to above.

Figure 5:
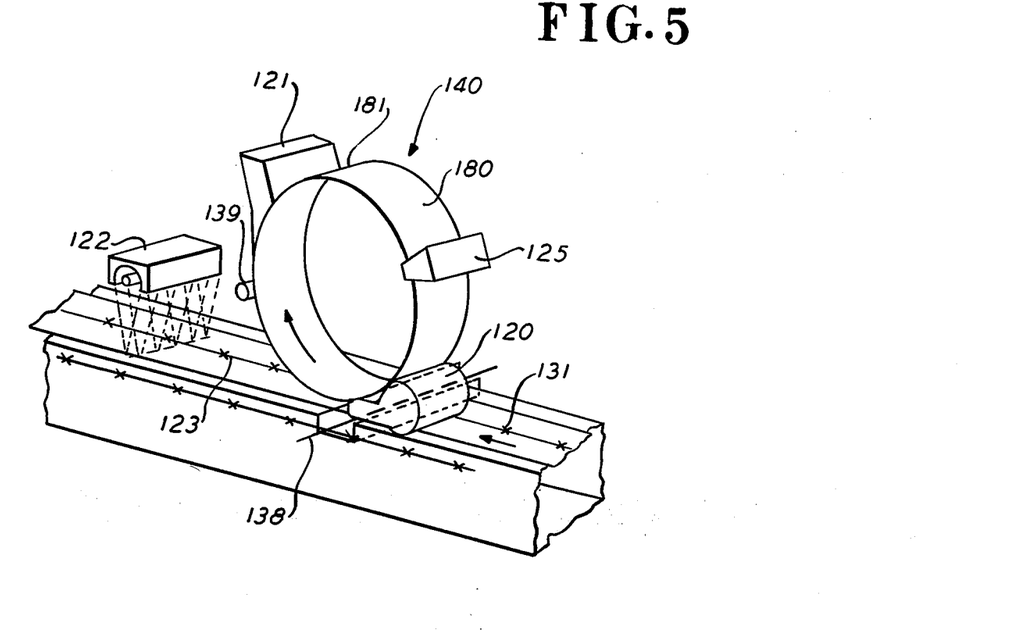
FIG. 5 is a perspective view of the matrix electrostatic printing system.

Referring now to FIG. 5, there is disclosed another embodiment of a document printing system utilizing an electrographic principle. An electronic command circuit (to be described more fully hereinafter) controls the actuation of a printing head 125. The printing head 125 comprises a matrix of electrically conductive electrodes or styli which are in contact with the sensitive surface 180 of a moving member here shown as a drum 181 but which may be also an endless web, disk or the like as in the case of drum 18.

Figure 9:
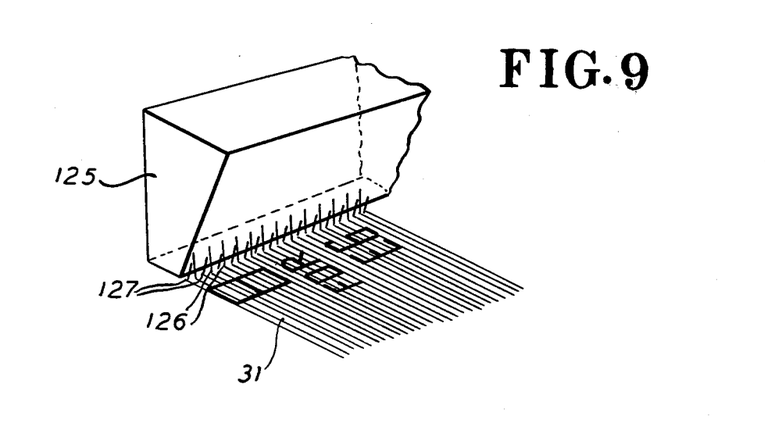
FIG. 9 is a perspective view of the matrix electrostatic printing head shown in FIG. 5.

As shown in FIG. 9, the styli may be arranged in two linear rows, the tips of the styli of one row 126 being separated from the styli tips of the adjacent row 127 by a small distance equal to about half the pitch value of the smallest type characters which are desired to be printed. In this way as the characters are printed, the density of individual dots which are characteristic of matrix printing is increased resulting in an improved matrix pattern. Although the styli are arranged in rows, each stylus is capable of being individually energized.

The styli rows 126, 127 are long enough to permit printing of the desired number of lines of characters across the width of the document stock 131.

As the various electrodes are individually energized in a time sequence, any character from any font: human readable, OCR-A or bar code; may be generated as a series of closely spaced dots on a sensitive surface moved relative to the matrix.

As each stylus or groups of styli in the matrix are energized upon command of the command circuit, a particular character stored in a memory materializes in the form of dots of electrostatic charges on the sensitive surface 180 of drum 181. The moving drum 181 serves to convey the latent electrostatic image of the character deposited on its surface 180 for development and transfer to the document stock 131 as a printed character.

The electrographic system employed herein utilizes essentially well-known electrostatic principles. Accordingly, this portion of the invention will be described only briefly. The web or drum 181 is coated with a dielectric material such as aluminum oxide, Mylar, Tedlar, or other like material which has the property of maintaining an electrostatic charge. A discharging station 139 removes any latent image on the dielectric surface 180 just prior to the point at which the drum or web 181 rotates into the charging area beneath the matrix printing head 125.

The character image generated onto the surface 180 through the styli corresponds to the image generated by the electronic command circuitry and takes the form of a latent electrostatic image on the surface 180. The rotation of drum 181 carries the latent image past a developing station 120 at which point a toner is applied in a well-known manner to the surface of the drum causing the character image charges to attract the toner thereby forming a pattern corresponding to that of the image.

As drum 181 rotates further, it comes in contact with the document stock 131. At this point, the toner image which appears on the surface 180 is transferred to the document stock 131 with the assistance of a transfer corona 138. As drum 181 continues rotating, a vacuum station 121 removes any remaining toner which was not transferred to the web 131. The drum 181 is now in a position to be discharged at station 139 and to repeat the charge pattern generating process once again.

A fuser 122 fuses and bonds the toner in the image of the character to the document surface in a manner similar to the corresponding fuser 22 in the electrophotographic embodiment.

The transport mechanism for moving the document stock 131 may be essentially the same as the previously-described electrophotographic embodiment given by way of example.

Figure 6:
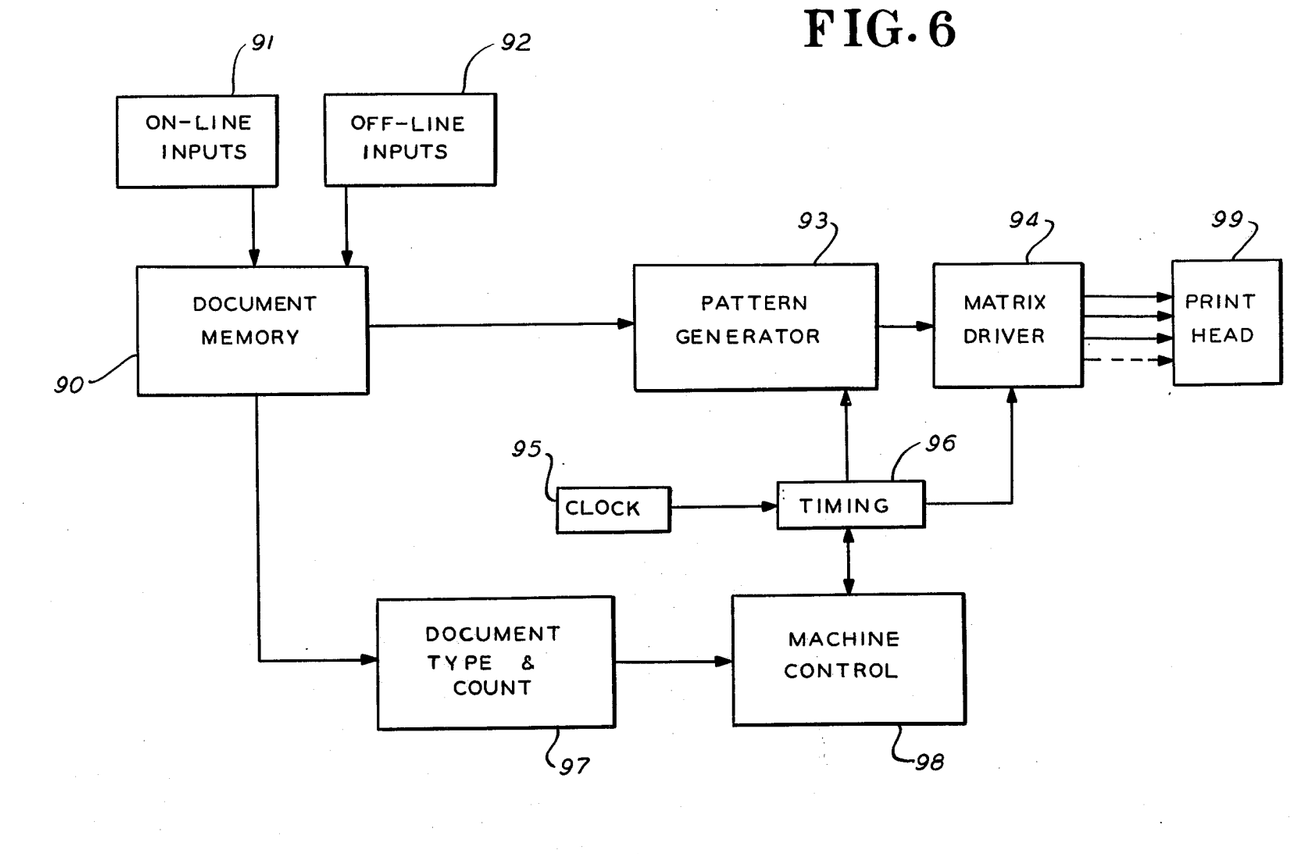
FIG. 6 is a block diagram of the electronic command circuit for the matrix electrostatic printing system.

Referring now to FIG. 6, there is shown a block diagram representation of the electronic command circuitry which controls the operation of the electrographic printing system disclosed in FIG. 5. A document memory 90 is adapted to receive data and instructions from a number of off-line peripherals including on-line units 91 and off-line units 92 similar to the types of peripheral units mentioned above in connection with FIG. 4.

As in the case of the embodiment of FIG. 4, the peripheral units provide the data which is intended to be formatted and printed on the document by the printing system. Such data is generated by the peripherals in a character serial sequence with appropriate punctuation signals, end of line signals, end of message signals, and the like to enable the data to be composed by arranging it in a format suitable for the document to be printed.

The peripheral units also have the capability of supplying instructions to the system which govern such functions as: the control of the number of documents to be printed, control of the number of documents printed bearing the identical message, and control of a number of auxiliary functions to be described hereinafter.

Document memory 90 accepts the data and instructions from the various peripherals and composes the data on a line-by-line format representative of the message which is to appear on the document as printed.

The document memory 90 has an output feeding a pattern generator 93 which controls the sequence of printing of the various characters in a columnar fashion, irrespective of the line on the document on which any particular character appears. Thus, although the peripherals feed the document memory with data to be printed on a character serial, line-by-line basis, the pattern generator 93 generates a timing sequence for printing which is dependent on the columnar location of the characters and may therefore be characterized as a character serial, line parallel sequence of printing.

The matrix driver 94 comprises a read-only-memory (ROM) in which the various characters comprising the several fonts are stored and which are accessed by the address information provided by the pattern generator 93.

The matrix driver 94 is provided with a plurality of output leads each of which corresponds to an electrode on the print head 99. Each of the leads is electrically activated in a time sequence which determines the character elements or dots to be printed.

A document type and count network 97 receives an input from the document memory 90 and controls such functions as: the number of identical documents to be printed, color striping function (to be described hereinafter), and so forth. A machine control network 98 is controlled by the document type and count network and governs such functions as the rotation of the drum or web 180, the starting and stopping of the transport belt, generation of single or multipart cut or perforated documents which are provided by a knife such as knife 30 shown in FIG. 4.

Since both embodiments of the printing apparatus disclosed herein are intended to be capable of continuous operation, that is, receiving new data and instructions from the peripheral units while printing previously received data on the document stock, there may arise conditions which cause interruptions in the printing. Under conditions such as a completion of a printing run with no new message ready for printing, the last-printed document will continue to issue from the apparatus for total processing and the document stock 31 will not have any message printed thereon since no characters were imaged onto the sensitive surface of the printer.

Referring again to FIG. 1, in order to eliminate wastage of unprinted document stock, the document stock 31 may be retracted on the transport belt or chain 23 by engaging a clutch mechanism 63 which cooperates with the idler wheel 26 so that unimaged stock can be returned to a position ahead of printer 40 in relation to the imaging means for printing.

In this so-called retract mode, the machine control network 88 or 98 actuates solenoid 64 which causes clutch assembly 28 coupled to drive wheel 25 to disengage, thereby halting the normal forward motion of the transport belt 23. Next, an electromagnetic reverse drive friction clutch 63 is actuated by the machine control network and couples the shaft 64 of idler wheel 26 to the shaft of motor 27 for driving of wheel 26 by the latter through a gear or pulley arrangement 12. Shaft 64 is turned in a counter-direction (as viewed in FIG. 1) by the action of motor 27 thereby causing idler wheel 26 to reverse its normal direction of rotation. Since clutch assembly 28 has been disengaged from the drive wheel 25, transport belt or chain 23 is free to turn in a direction opposite to its normal direction of motion. Therefore, any document stock 31 or 131 which has passed the printing station 40 or 140 and which has not been printed upon can be returned to a point prior to the print station by this reversal of the normal direction of travel of the document stock 31.

After transport belt 23 has been retracted sufficiently to allow the leading edge of the document stock 31 to be positioned a suitable distance upstream from the imaging area of drum 18 or 181, the machine control network 88 or 98 causes the electromagnetic clutch 63 to disengage from the idler wheel 26. Clutch 28 is then reengaged by actuating solenoid 64 and the transport belt 23 and the document stock 31 resume their normal continuous synchronous forward motion past the printing station 40.

Figures 7, 8:
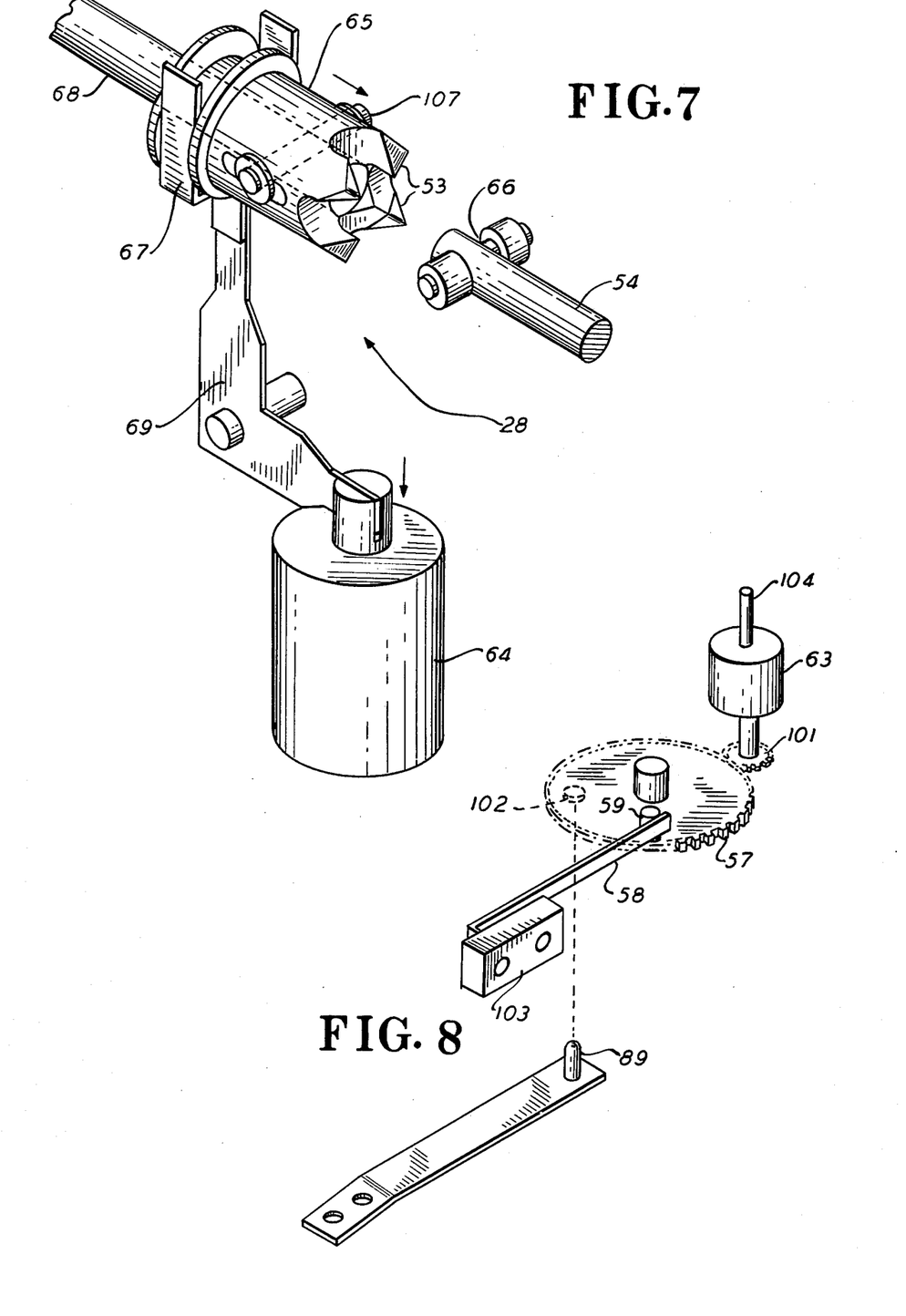
FIG. 7 is a perspective view of a clutch assembly utilized in the printing system.
FIG. 8 is a perspective view of a clutch assembly utilized in the printing system.

The arrangement of clutch 28 and the sequence of operation to achieve retraction of web 31 will be more fully described by referring to FIG. 7. The clutch assembly 28 comrises a solenoid 64 under control of the machine control network 88 or 98 which is coupled to a four-jaw clutch 65 by means of a bell-crank 69 and a yoke 67. Whenever solenoid 64 is actuated, the clutch 65 is moved through a slot in the clutch side surface relative to a pin 107 connected to shaft 68 in a direction parallel to the axis of the shaft. Shaft 68 is coupled to motor 27 by means of a gear or pulley arrangement 30 (FIG. 1) and is intended to be rotated continuously by the motor.

The end of clutch 65 is provided with four-jaws defined by four orthogonal cams 53. Clutch 65 normally engages a T-bar 66 provided at the end of shaft 54 which is fastened to drive wheel 25 for moving transport belt 23. The yoke 67 permits the four-jaw clutch 65 to be moved into and out of engagement with the T-bar 66, while being rotated along with shaft 68. Drive wheel 25 has its diameter dimensioned so that a 90° rotation of wheel 25 (and associated clutch 65) corresponds to a displacement of the transport belt 23 of one document width, or the distance between two holes 14 in the document stock.

Referring now to FIG. 8, there is shown the electromagnetic reverse drive clutch 63, having one of its ends receiving shaft 104 which is connected to the idler wheel 26 associated with transport belt or chain 23 (FIG. 1). The other end of the clutch 63 is coupled by means of a pinion 101 to a gear wheel 57.

One side of gear wheel 57 is provided with a detent 102 for cooperating with a pin 89 and a spring lever which fits into the detent and maintains gear wheel 57 fast during the normal forward operation of the transport belt 23.

The other side of gear wheel 57 includes a pin disposed near the edge which cooperates with the arm 58 of a microswitch 103 which cooperates sequentially therewith whenever wheel 57 rotates.

The retract mode of operation is accomplished by the solenoid 64 being actuated thereby removing clutch 65 from T-bar 66, thereby halting forward motion of the transport belt 23. Reverse drive clutch 63 is then actuated and the motion of gear wheel 57, which is driven through pulley 12 by motor 27, is coupled via pinion 101 through the clutch 63 to shaft 104 which causes the transport belt 23 to retract. As gear wheel 57 rotates the microswitch 103 to closed whenever pin 59 contacts switch lever 58 thereby signaling to the command circuit the completion of retraction of belt 23.

The machine control network 88 or 98 then actuates solenoid 64 bringing clutch 65 into engagement with T-bar 66 to thereby resume the normal forward direction of the belt 23.

Since 90° of rotation of shaft 68 corresponds to the full width of a single document, disengagement permits accurate resynchronization of the transport belt or chain with the remaining rotational elements of the printing system.

A color striping mechanism symbolized by a pair of color striping wheels 55 may be selectively engaged to ink one or more color bands on the surface of the documents for any desired purpose. The document stock 31 may be separated or perforated into individual or multipart portions (if not previously separated or perforated) by means of a selectively engageable cutoff assembly shown schematically as 35.

Normal operation of the transport belt 23 mechanism is checked by means of a detector 56 which is rotated by the surface of the document stock 31, the edge of the detector wheel 56 being in contact with the document 31 surface. Should the document stock 31 halt in motion by a jam, wheel 56 will cease to turn. A sensor system, not shown, may be utilized in conjunction with the wheel 56 to detect such cessation of motion of the wheel and thereby cause the equipment to automatically shut down or signal an operator or both.

An example of a prior art system, with respect to which the present invention is an improvement, is U.S. Pat. No. 3,696,717 issued Oct. 10, 1972.

Having described the invention, it is obvious that many additional modifications and alternatives are possible without departing from the inventive concept which is to be measured solely from the appended claims.

What is claimed is:

1. System for printing particular information-bearing symbols corresponding to data emanating from a source, comprising:
   source means capable of generating data in a serial sequence;
   memory means for storing information-bearing symbols;
   a medium comprising a printable record material adapted to bear printed information-bearing symbols;
   selection means comprising illumination means for selecting particular symbols from said memory means corresponding to data emanating from said source;
   transmitting means for transmitting each of said particular symbols from said memory means to said medium;
   said memory means comprising mask means for storing said information-bearing symbols in a visible format;
   said mask means being movable relative to said illumination means for bringing said information-bearing symbols into operative proximity to said illumination means for subsequent selective illumination thereof;
   said mask means comprising an endless loop of material embodying said information-bearing symbols;
   said information-bearing symbols being arranged on said mask in rows and columns, an entire column of said symbols being brought into operative proximity to said illumination means at a given time and successive columns of said symbols being brought into operative proximity to said illumination means at corresponding successive times;
   said illumination means ordering said particular symbols by selectively illuminating, simultaneously, certain desired symbols included within the given column which is in operative proximity with said illumination means;
   said transmitting means transmitting in a column-by-column format said selectively illuminated desired symbols to said record material; whereby
   said record material is printed by simultaneously printing the desired symbols in a column-by-column sequence, the columns being substantially perpendicular to the direction in which said record material would conventionally be read by a human agency.

2. System for printing as set forth in claim 1, wherein:
   said illumination means comprises a plurality of light sources, each of said light sources being associated with a predetermined area of said mask means.

3. System for printing as set forth in claim 2, further comprising:
   imaging means for conveying said illuminated symbols to said transmitting means.

4. System for printing as set forth in claim 1, wherein:
   said information-bearing symbols comprise a plurality of sets of symbols, each of said sets comprising a font in which each of the symbols share at least one common distinguishing feature.

5. System for printing as set forth in claim 4, wherein:
   said sets are arranged in a plurality of parallel bands extending across said mask.

6. System for printing as set forth in claim 5, wherein:
   said selection means is adapted to scan said bands and to select particular symbols during scanning for conveyance to said transmitting means.

7. System for printing as set forth in claim 6, wherein:
   said mask is scanned by said selection means cyclically.

8. System for printing as set forth in claim 7, wherein:
   said mask includes position-locating means for permitting said selection means to locate the position of said symbols for selection thereof.

9. System for printing as set forth in claim 8, wherein:
   each of said bands is comprised of a series of window means extending across said mask;
   each of said window means being adapted to accommodate at least a portion of a symbol.

10. System for printing as set forth in claim 9, wherein:
    said position-locating means comprises at least one timing band comprising a plurality of position marks; each of said position marks being associated with particular window means.

11. System for printing as set forth in claim 9, wherein:
    said mask is cyclically scanned by said selection means each cycle of scanning commencing from a reference associated with said mask;
    said transmitting means being movable relative to said medium.

12. System for printing as set forth in claim 11, wherein:
    each of said symbols is positioned within the respective associated window means as a function of the distance between said window means and said reference.

13. System for printing as set forth in claim 11, wherein:
    a first of said plurality of bands contains symbols having a first pitch value; and
    a second of said plurality of bands contains symbols having a second pitch value.

14. System for printing as set forth in claim 6, wherein:
    said transmitting means includes a surface movable between said selection means and said medium;
    said surface being adapted to store said selected symbols as corresponding images;
    said symbols being conveyed to said surface on a plurality of lines simultaneously, adjacent symbols within each of said lines being conveyed to said surface serially.

15. System for printing as set forth in claim 14, further including:
    developing means associated with said transmitting means for developing said symbol images;
    said developed symbol images being subsequently transferred to said medium as printed symbols.

16. System for printing as set forth in claim 15, wherein:
    said developed symbol images are transferred to said medium in the same sequence as the conveyance of symbols to said surface;
    said medium being movable relative to said surface.

17. System for printing as set forth in claim 4, wherein:

said common distinguishing feature is the value of pitch of said symbols.

18. System for printing particular information-bearing symbols corresponding to data emanating from a source, comprising:

source means capable of generating data in a serial sequence;

electronic memory means for storing information-bearing symbols and generating particular symbols upon command;

a medium comprising a printable record material adapted to bear printed information-bearing symbols;

selection means for commanding the generation of said particular symbols from said memory means corresponding to data emanating from said source;

transmitting means for transmitting each of said particular symbols from said memory means to said medium;

matrix means electrically connected to said selection means and operatively associated with said transmitting means for creating a developable image of said selected symbols on said transmitting means;

said particular symbols capable of being generated in a predetermined sequence of columns and rows, an entire column of said symbols capable of being generated at a given time and successive columns of said symbols capable of being generated at corresponding successive times;

said selection means ordering said particular symbols by selectively commanding the generation, simultaneously, of certain desired symbols included within a given column;

said transmitting means transmitting in a column-by-column format said selectively generated symbols to said record material; whereby said record material is printed by simultaneously printing the desired symbols in a column-by-column sequence, the columns being substantially perpendicular to the direction in which said record material would conventionally be read by a human agency.

19. System for printing as set forth in claim 18, wherein:

said transmitting means includes a surface movable between said selection means and said medium;

said surface being adapted to store said selected symbols as corresponding developable images.

20. System for printing as set forth in claim 19, further including:

developing means associated with said transmitting means for developing said symbol images;

said developed symbol images being subsequently transferred to said medium as printed symbols.

21. System for printing as set forth in claim 19, wherein:

said surface is capable of maintaining an electrostatic image of each of said symbols.

* * * * *

UNITED STATES PATENT AND TRADEMARK OFFICE
CERTIFICATE OF CORRECTION

PATENT NO. : 4,189,217
DATED : Feb. 19, 1980
INVENTOR(S) : Amnon Goldstein, Robert W. Swett, David L. Greenwood It is certified that error appears in the above—identified patent and that said Letters Patent is hereby corrected as shown below:

Column 1, line 20, change "success" to --sources--

Column 4, line 20, change "use" to --fuse--

Column 6, line 23, change "systems" to --system-- line 61, change "or" to --of-- line 64, change "or" to --of--

Column 7, line 10, change ":" to --;--

Column 10, line 14, change "the" to --that--

Signed and Sealed this

Eighteenth Day of November 1980

[SEAL]

Attest:

Attesting Officer

SIDNEY A. DIAMOND

Commissioner of Patents and Trademar